United States Patent [19]

Tanaka

[11] Patent Number: 4,924,075
[45] Date of Patent: May 8, 1990

[54] SMART IC CARD

[75] Inventor: Tsutomu Tanaka, Tokyo, Japan

[73] Assignee: Kabushiki Kaisha Toshiba, Kawasaki, Japan

[21] Appl. No.: 250,724

[22] Filed: Sep. 29, 1988

[30] Foreign Application Priority Data

Sep. 30, 1987 [JP] Japan .................... 62-246042

[51] Int. Cl.⁵ ............................ G06K 5/00
[52] U.S. Cl. .................. 235/380; 235/379; 235/381
[58] Field of Search ........... 235/379, 380, 381, 492

[56] References Cited

U.S. PATENT DOCUMENTS 3,813,533  5/1974  Cone et al. .
4,529,780  7/1985  Chaum .................... 235/379
4,614,861  9/1986  Pavlov et al. .
4,697,072  9/1987  Kawana .

FOREIGN PATENT DOCUMENTS

0167044  1/1986  European Pat. Off. .

Primary Examiner—Harold I. Pitts
Attorney, Agent, or Firm—Cushman, Darby & Cushman

[57] ABSTRACT

A hand-held electronic apparatus such as an IC card including a data memory and a CPU has a keyboard and a display. The IC card includes a timepiece circuit which is kept operated. The IC card turns off the display in the standby state in order to save an internal battery. The CPU is also set in a HALT state since no clock signal is supplied thereto. When a start key for activating the IC card is pressed in the HALT state, the CPU is brought to an active state, and timepiece data from the timepiece circuit is automatically displayed on the display. When a numerical key is operated in the timepiece display state, a control mode is turned from the timepiece mode to a calculator mode, and a number corresponding to the pressed numerical key is input at a first digit position. If an account key (7-10) is pressed in the timepiece display state, a transaction mode of the corresponding account is set.

12 Claims, 7 Drawing Sheets

ALTERNATELY DISPLAYED

SMART IC CARD

BACKGROUND OF THE INVENTION

1. Field of the Invention

The present invention relates to a hand-held electronic apparatus, a so-called IC cards which are used as credit cards, cash cards, transaction cards, debit cards, etc.

2. Description of the Prior Art

Cards having a magnetic strip on their reverse sides have been known for quite some time. They are used as bank cards, credit cards, cash cards, etc. On the magnetic strip there is encoded various account information which may include a password, account type designator, etc. There is now considerable interest in utilizing a more intelligent card in place of the magnetic strip type card. The more intelligent card has at least one integrated circuit (IC) chip embedded in it. The card includes a programmable non-volatile memory, and a control element such as a CPU for controlling the memory and the like. With this IC card, transaction account data stored in the memory is read by a terminal to perform a transaction.

As disclosed in U.S. Pat. No. 4,697,072, the subject matter of which is incorporated by reference as if fully set forth herein, and U.S. Pat. No. 4,614,861, the subject matter of which is incorporated by reference as if fully set forth herein, a card which incorporates a battery and includes a keyboard and a display has been developed. Such a card can be used alone without being connected to a terminal.

European Patent Disclosure No. 0 167 044 (published) discloses an IC card with a timepiece for displaying timepiece data such as date and time, and a calculator for performing arithmetic operations. However, in the European Patent Disclosure IC card, the IC's display is not turned off in an initial state. U.S. Pat. No. 3,813,533, the subject matter of which is incorporated by reference as if fully set forth herein, discloses an apparatus having both timepiece and calculator functions. It is a rather compact device that includes both an electronic calculator and a timepiece. When a power switch of the card is turned on, a calculator mode is set. A special purpose key is provided for causing the device to operate in a timepiece mode. When that special purpose key is pressed while the device is operating in its calculator mode, the device changes its mode of operation and begins to operate in its timepiece mode. When the special purpose key is again pressed, while the device is operating in the timepiece mode, the device again operates in its calculator mode.

Some devices operate in a timepiece mode only while a special purpose key is maintained pressed after the power switch is turned on. In conventional devices, a special-purpose key is generally provided for causing the device to operate in a timepiece mode. This special purpose key must be operated each time the device is to be operated in the timepiece mode.

For battery powered IC cards, it is desirable to minimize battery drain to extend its useful life. Therefore, battery power must be conserved where possible. However, in conventional devices of this type, no particular means are provided for conserving battery life.

SUMMARY OF THE INVENTION

It is an object of the present invention to provide a hand-held IC card that does not require a special-purpose key for causing the device to operate in its timepiece mode and which can operate in its timepiece mode without requiring an extra operation.

It is another object of the present invention to provide a hand-held IC card which conserves battery life as much as possible.

A hand-held IC card according to the present invention includes a keyboard having at least a start key for causing the card to begin operating. It includes timepiece means for generating timepiece data, display means for displaying the timepiece data generated by the timepiece means and other data, and control means for, when the start key is pressed, causing the display mans to display the timepiece data generated by the timepiece means, thereby effectively operating the device in a timepiece mode.

DETAILED DESCRIPTION OF THE PREFERRED EMBODIMENTS

An embodiment of the present invention will be described with reference to the accompanying drawings.

Figure 2:
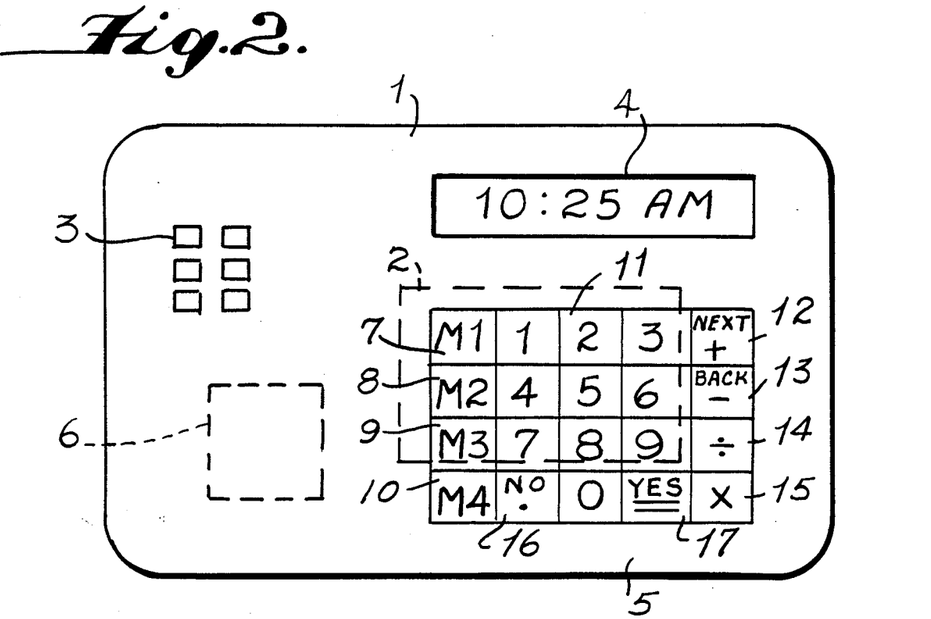
FIG. 2 is a plan view showing the outward appearance of the IC card according to the present invention.

FIG. 2 shows the outward appearance of a multifunctional IC card used as a credit card in accordance with a presently preferred embodiment of the present invention. The IC card can be used for both an on-line operation (operation during which the IC card communicates with some other device, such as a terminal, a computer, etc.) and an off-line operation (operation in which the card is operated without being connected to any other device). The IC card can operate in a transaction mode during which it conducts various transactions with a plurality of accounts (e.g., the IC card can be used as a plurality of types of credit cards and cash cards). The IC card can also operate in a timepiece mode for displaying timepiece data including date and time data. In addition, the IC card can operate in a calculator mode in which it performs at least basic arithmetic operations. The IC card is also operable in an electronic memorandum mode during which it stores and reads address data, name data, telephone number data, etc.

A card body 1 of the IC card is formed of a rectangular thin plastic plate. A contact section 3 is arranged on a predetermined surface portion of the card body 1. Contact section 3 is electrically connected to an integrated circuit (IC) 2 embedded in card body 1. Contact section 3 may be selectively electrically connected to a terminal (not shown) such as a card reader/writer for on-line operation. a liquid crystal display 4 displays I/O data, timepiece data, and the like. A keyboard 5 is provided on a surface portion of card body 1. A battery 6 is embedded in card body 1 for supplying power to all circuits requiring power.

Keyboard 5 includes a plurality of account keys 7, 8, 9, and 10 for designating corresponding accounts, ten keys 11, and arithmetic operation keys. The arithmetic operation keys include an addition key 12, a subtraction key 13, a division key 14, a multiplication key 15, a decimal key 16, an equal key 17, etc.

Account key 7 designates a first job (processing) for a first account (e.g., a first credit card account). Account key 8 designates a second job for a second account (e.g., a second credit card). Account key 9 designates a third job for a third account (e.g., a first cash card). Account key 10 designates a fourth job for a fourth account (e.g., a second cash card).

Addition key 12 also serves as a NEXT key (mode advance key) for advancing a display state of display 4 or a function mode to the next state or mode. Subtraction key 13 also serves as a BACK key (mode return key) for returning a display state of display 4 of a function mode to the previous state or mode. Decimal key 16 also serves as a NO key or a mode end key, and equal (=) key 17 also serves as a YES key (selection key) or a start key (power-on key).

Figure 3:
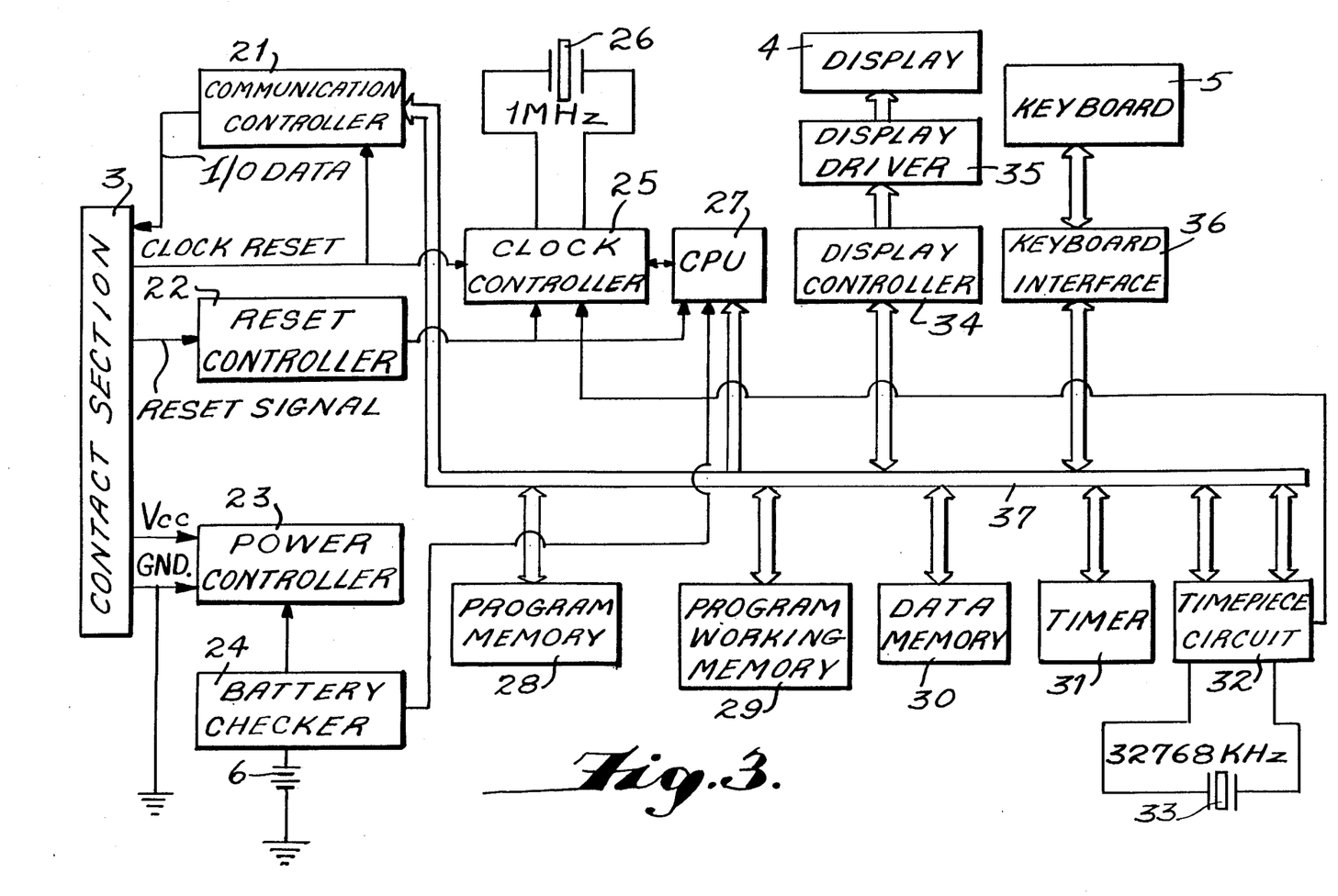
FIG. 3 is a block diagram of various electronic circuit portions of an IC card according to the present invention.

FIG. 3 is a block diagram of various electronic circuit portions of an IC car according to the present invention. IC card 1 includes contact section 3, a communication controller 21, a reset controller 22, and power controller 3. Battery 6 is preferably 3 volts. A battery checker 24 is provided for monitoring whether or not the voltage of battery 6 is above a specified voltage. Also included are a clock controller 25, oscillator 26 having a piezoelectric crystal element for generating a high frequency signal of 1 MHz, and CPU 27. A program memory 28 stores control programs. Also provided are a program working memory 29, and data memory 30 which stores a personal identification number (e.g., 4 digits) and data. Data memory 30 is preferably of the EEPROM (Electric Erasable Programmable ROM type). Further IC card 1 comprises a timer 31 used for timekeeping during data processing, timepiece circuit 32, and oscillator 33 having a piezoelectric crystal element adapted for generating basic clock signals. The oscillator 33 is arranged to normally generate a low frequency and high precision signal of 32.768 KHz. In addition, IC card 1 includes display controller 34, display driver 35 for driving display 4 and keyboard interface 36 receiving key inputs from keyboard 5.

Communication controller 21, CPU 27, program memory 28, program working memory 29, data memory 30, timer circuit 31, timepiece circuit 32, display controller 34, and keyboard interface 36 are interconnected through a data bus 37.

Communication controller 21 is used when the IC card is operated on-line. Communication controller 21 converts serial data supplied from a terminal (not shown) through contact section 3 into parallel data, and outputs the parallel data onto data bus 37, or converts parallel data supplied from data bus 37 into serial data and outputs the serial data to the terminal through contact section 3.

Reset controller 22 is operated in the on-line operation mode. Reset controller from a battery mode wherein power is drawn from battery 6 to an external power supply mode wherein a voltage Vcc is supplied from the terminal through contact section 3. When the IC card is operated off-line, i.e., when the voltage of the external power supply is decreased, power controller 23 switches drive control from the external power supply mode to the battery mode.

Clock controller 25 stops the operation of oscillator 26 for generating the clock signal in a key input awaiting state (standby mode). As a result, supply of the clock signal to CPU 27 is also stopped, and CPU 27 is brought to a complete HALT state. When start key (YES key) 17 is turned on, clock controller 26 activates oscillator 26, and supplies a 32.768-kHz timepiece clock signal output from timepiece circuit 32 to CPU 27. When the next key operation is made, clock controller 25 supplies the clock signal output from oscillator 26 to CPU 7. During on-line operation, when clock controller 25 receives a reset signal supplied from reset controller 22, it supplies a clock signal supplied from the terminal through contact section 3 to CPU 27.

Program memory 28 stores a transaction function program, a timepiece function program, a calculator function program, an electronic memorandum function program, and other programs. CPU 27 selectively executes the programs in program memory 28 to selectively effect the corresponding one of e.g., a transaction function mode, a timepiece function mode, a calculator function mode, an electronic memorandum function mode and the like.

Data memory 30 stores account data corresponding to the first to fourth accounts. Upon depression of one of account keys 7 to 10, the corresponding account data is selected, and the corresponding job is executed based on the account data. Data memory 30 includes an electronic memorandum area, which stores address data, name data, telephone number data, and the like.

Timepiece circuit 32 includes a first timepiece which can be freely set by a card holder, and a second timepiece for a transaction, in which world standard time is set at the time the card is issued and which cannot be altered. Timepiece circuit 32 divides and counts a clock signal output from oscillator 33 to generate timepiece data, and is composed mainly of a plurality of counters.

Display controller 34 converts display data supplied from CPU 27 into character patterns using an internal character generator (not shown) comprising a ROM, and displays the character patterns on display 4 through display driver 35.

Figure 1:
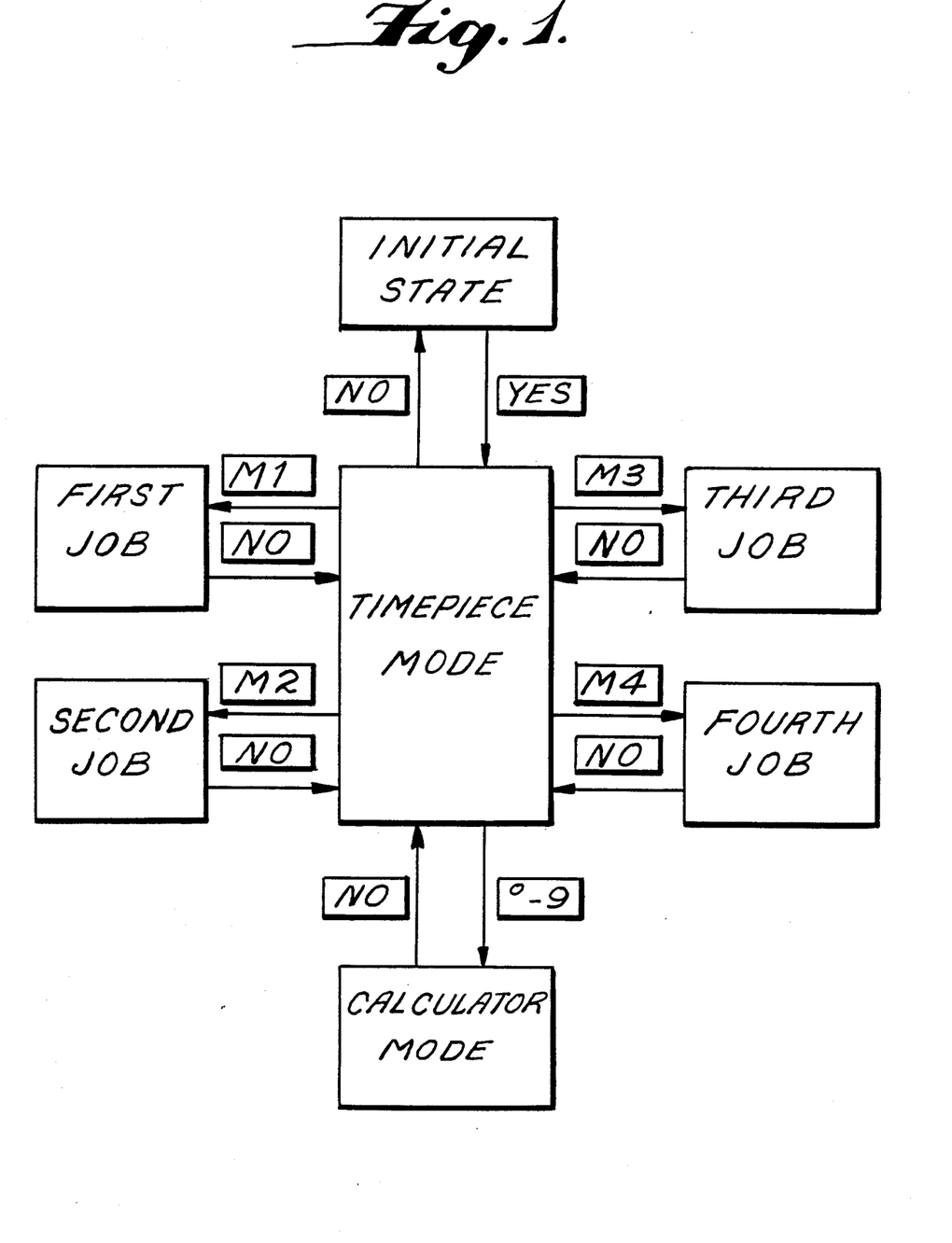
FIG. 1 is a state transition chart explaining various operating modes of the IC card according to the present invention.

The operation of the IC card with the above arrangement will be described with reference to the state transition chart of FIG. 1. In an initial state (standby state), CPU 27 is in a HALT state, and liquid crystal display 4 is turned off. This is to save power consumption in the IC card, i.e., to save battery 6. For the same reason, oscillator 26 is kept off. Although battery 6 is connected to the various electronic circuits, battery drain is slight because the circuits employ CMOS elements which have very small power consumption. This state is substantially equivalent to a power-off state. However, timepiece oscillator 33 and timepiece circuit 32 are operated. Since a quartz oscillator of a low frequency, e.g. 32.768 KHz. is used for this portion, power consumption is saved.

Figure 4:
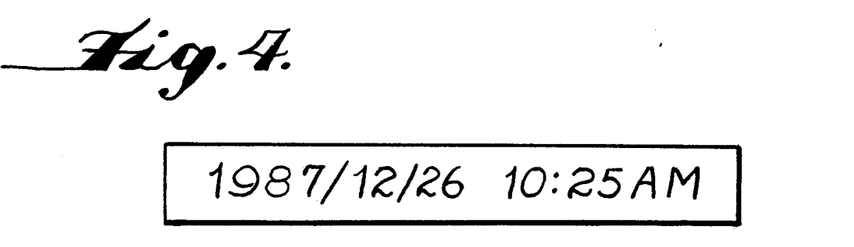
FIGS. 4 and 5 are views showing display formats of timepiece data as displayed by an IC card according to the present invention.
Figure 5A:
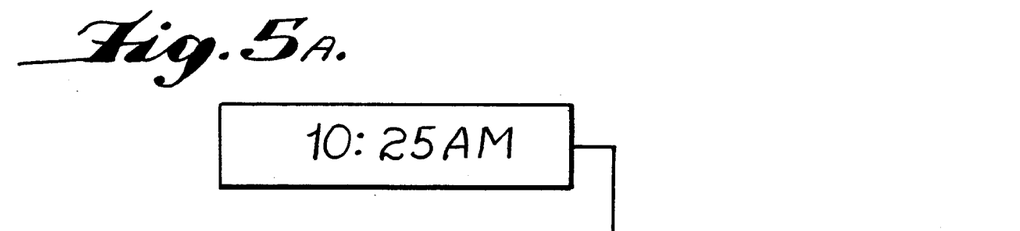
Figure 5B:
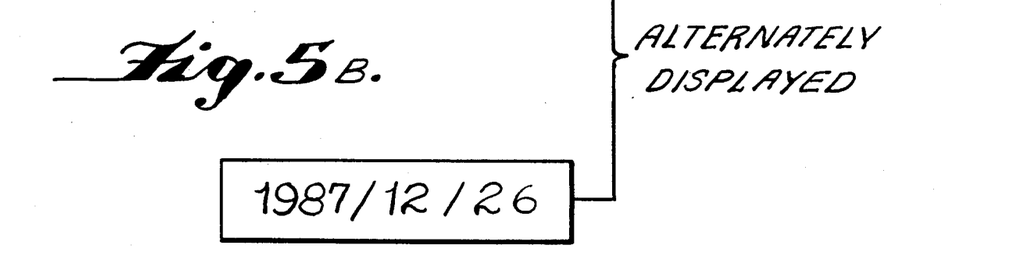

In the initial state, when start key (YES key) 17 at keyboard 5 is pressed, an interrupt signal is supplied to CPU 27 and CPU 27 executes the timepiece function program. CPU 27 reads timepiece data including date and time data from timepiece circuit 32, and causes display 4 to display the timepiece data. For a display format in this case, if display 4 has sufficient digit positions, date and time data can be simultaneously displayed, as shown in FIG. 4. However, if display 4 does not have sufficient digit positions, date and time data can be alternately displayed for a predetermined cycle, as shown in FIG. 5. When date and time data are alternately displayed, as shown in FIG. 5, the following two control methods may be adopted. In one control method, a buffer memory for two lines is provided to display controller 34, so that the above data are alternately displayed under the hardware, control. In the other control method, a buffer memory for only one line is provided to hardware, so that the data are alternately displayed under the software control.

In this manner, when start key 17 is pressed, timepiece data is automatically displayed. This state is a timepiece mode. In addition to display of current date and time, the timepiece mode allows a card holder to know that the IC card is put into an active state. In this embodiment, the timepiece function is temporarily and automatically executed before and after execution of an original job.

The original job is executed via the above-mentioned timepiece mode. More specifically, when one of account keys 7 to 10 is pressed when the IC card is being operated in the timepiece mode, CPU 27 discriminates the pressed key through keyboard interface 36. As a result, if the pressed key is one of account keys 7 to 10, the transaction function program of the corresponding job is executed.

Upon completion of one job, the initial state can be resumed via the timepiece mode, or another job can be executed. More specifically, when processing of the first job is ended by end key (NO key) 16, CPU 27 enters the timepiece mode again to display the timepiece data. If NO key 16 is pressed again in this state, CPU 27 turns off display 4, and sets other circuits excluding oscillator 33 and timepiece circuit 32 in an inactive state, thereby setting the initial state (power-off state). When account key 8 is pressed in the timepiece mode, processing of the second job is started. Furthermore, if keyboard 5 is not operated for a predetermined period of time in the timepiece mode, CPU 27 detects this, and sets the initial state.

In this manner, the respective jobs are executed from the timepiece mode as a start point, and the timepiece mode is resumed upon completion of each job. Thus, operations can be consistent, resulting in easy understanding.

Figure 6:
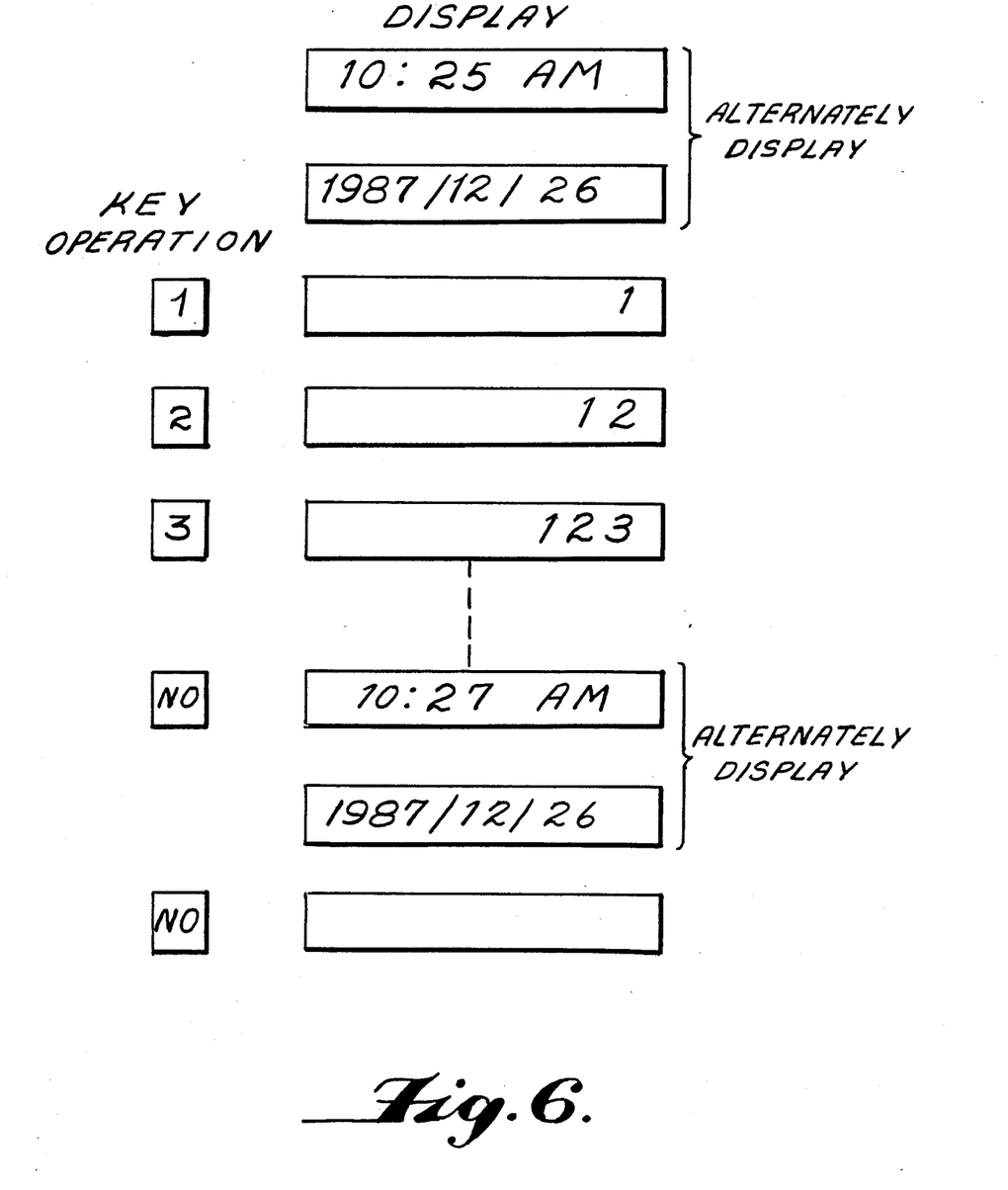
FIG. 6 is a view showing display formats of data when the IC card according to the present invention is operated in a calculator mode.

The calculator mode of operation will now be described. If a numerical key of ten keys 11 is pressed in the timepiece mode described above, the timepiece mode is automatically terminated, and the calculator mode is set. More specifically, when the numerical key is pressed, CPU 27 interrupts execution of the timepiece function, and starts execution of the calculator function program. CPU 27 stores a number corresponding to the pressed numerical key at a first digit position. When numerical keys are sequentially set. For example, when the calculation processing is ended by end key (NO key) 16, CPU 37 resumes the timepiece mode to display timepiece data. If NO key 16 pressed again in this state, CPU 27 is brought to the initial state. FIG. 6 shows this state.

In this manner, when a start key for starting the IC card is pressed, it automatically operates in a timepiece mode causing the display to show timepiece data. When a numerical key is pressed in this state, the calculator mode is selected, and a number corresponding to the pressed numerical key is set at a first digit position of the calculator. When control is escaped from the calculator mode, the timepiece mode is restarted. Thus, no special-purpose key for starting the timepiece function is required, and the timepiece function can be utilized without an extra operation. In addition, the timepiece and calculator functions can be easily switched, which is very convenient.

Figure 7A:
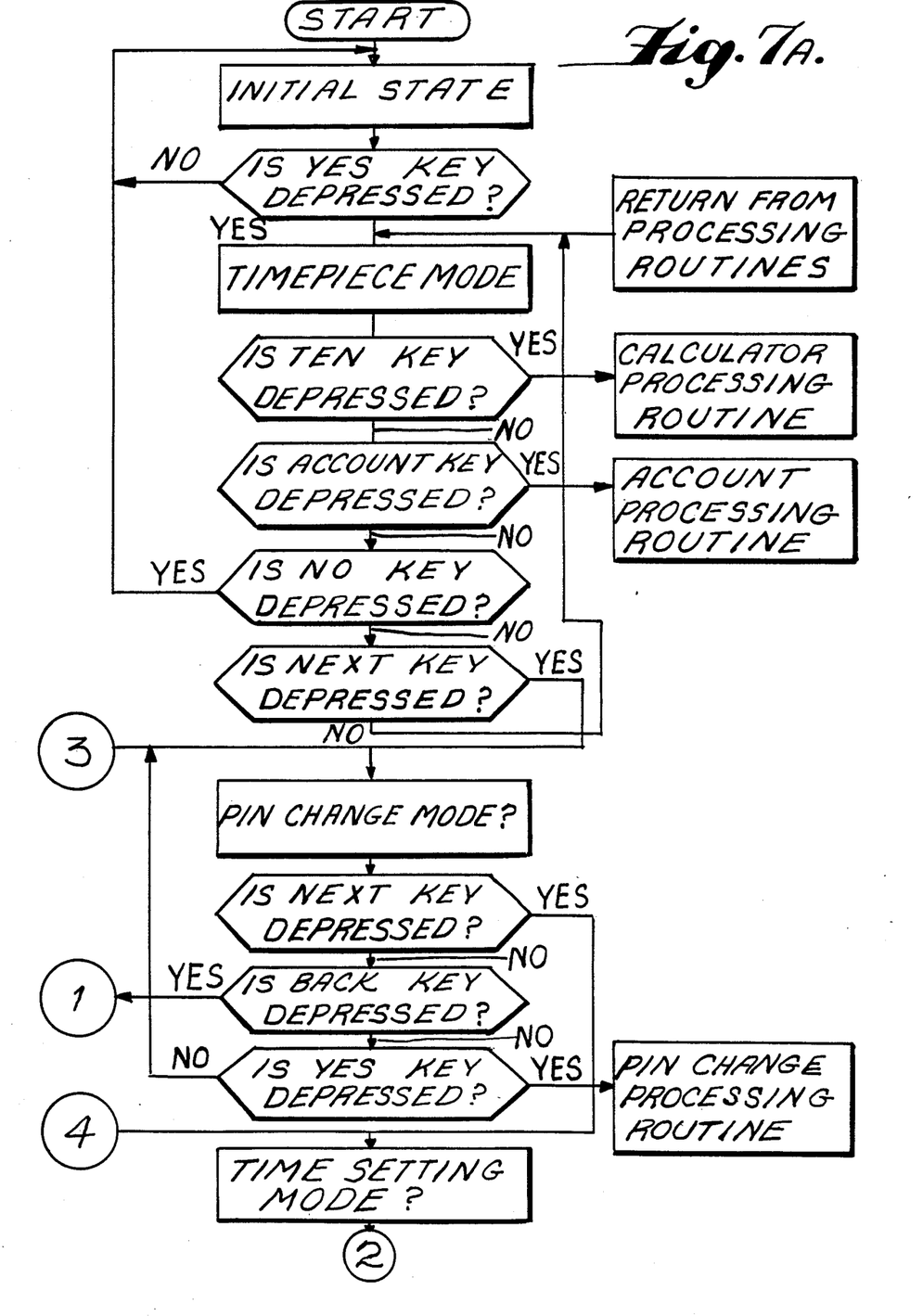
FIGS. 7A and 7B are flow charts of various selecting and executing function routines of the IC card according to the present invention.
Figure 7B:
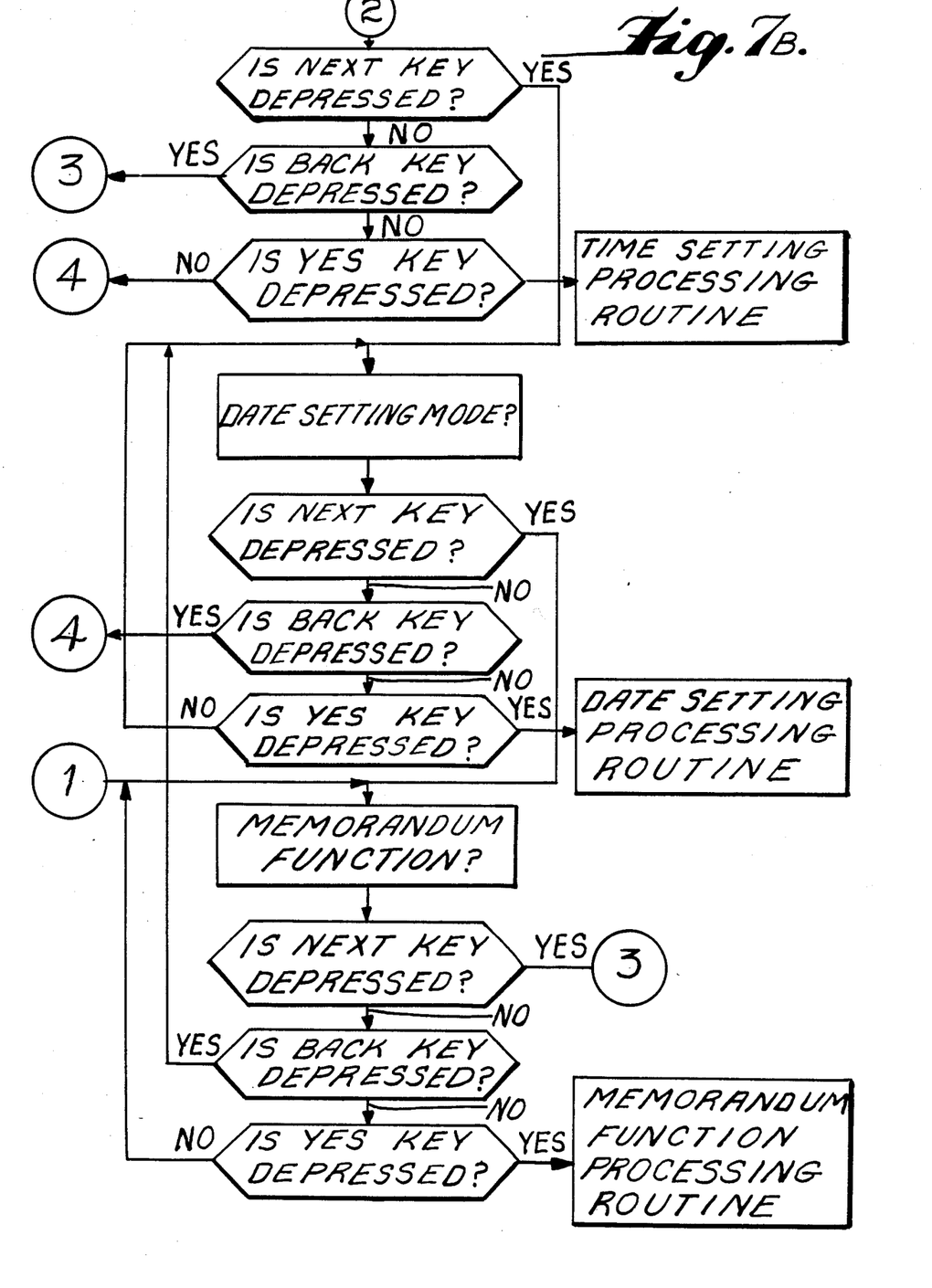

The overall operation including the electronic memorandum function will be described with reference to the flow chart shown in FIG. 7. If start key (YES key) 17 is pressed in the initial state, the IC card is operated in its timepiece mode. CPU 27 reads out date and time data from timepiece circuit 32, and causes display 4 to display the data. If a numerical key is pressed in the timepiece mode, the calculator function is executed. If one of account keys 7 to 10 is pressed, processing associated with the corresponding account is executed, as described above.

If NO key 16 is pressed while date and time data are displayed in the timepiece mode, display 4 is turned off to set the initial state. If NEXT key 12 serving as the mode advance key is pressed in the timepiece mode, the display mode is switched from the timepiece mode to a specific function display mode for displaying types of processing functions (menu).

More specifically, when NEXT key 12 is pressed while date and time data are displayed on display 4, a display content of display 4 is switched to a first menu "PIN change mode?". When NEXT key 12 is pressed while the menu "PIN change mode?" is displayed, the display is switched from "PIN change mode?" to a second menu "time setting mode?". If NEXT key 12 is pressed while the menu "time setting mode?" is displayed, the display is switched from "time setting mode?" to a third menu "date setting mode?".

Furthermore, if NEXT key 12 is pressed while the menu "date setting mode?" is displayed, the display is switched from "date setting mode?" to a fourth menu "memorandum function?". If NEXT key 12 is pressed while the menu "memorandum function?" is displayed, the first menu "PIN change mode?" is displayed again. Note that if NO key 16 is pressed during display of every menu, the timepiece mode is selected.

If BACK key 13 serving as the mode return key is pressed during display of the menu, a menu immediately preceding the currently displayed menu is displayed. For example, if BACK key 13 is pressed while the fourth menu "memorandum function?" is displayed, the display is returned to the third menu "date setting mode?".

If YES key 17 is pressed during the display of the menu, the processing function corresponding to the menu displayed on display 4 is executed. If a PIN change function as a first processing function is designated upon depression of YES key 17 during display of the first menu "PIN change mode?" on display 4, a PIN change processing routine is executed, so that PIN data stored in data memory 30 can be changed.

If a time setting function as a second processing function is designated upon depression of YES key 17 during display of the second menu "time setting mode?", a time setting routine is executed, and time data of the display timepiece of timepiece circuit 32 can be changed.

If a date setting function as a third processing function is designated upon depression of YES key 17 during display of the third menu "data setting mode?", a data setting routine is executed, and date data of the display timepiece of timepiece circuit 32 can be changed. Note that if NO key 16 is pressed upon completion of the processing routine, the display is switched to the timepiece mode.

As described above, the type of processing function (menu) is switched in accordance with depression of the NEXT or BACK key to display the selected menu on the display. When the YES key is pressed while a menu corresponding to the desired processing function is displayed, the processing function corresponding to the menu displayed on the display is executed (started). More specifically, many functions can be individually executed by a predetermined number of keys without assigning a key to each function. Thus, if a function of the IC card is changed or added, the number or arrangement of keys need not be changed, and letters printed on keys can be fixed regardless of functions. Therefore, functions can be easily changed or added by changing a program of the CPU.

Figure 8:
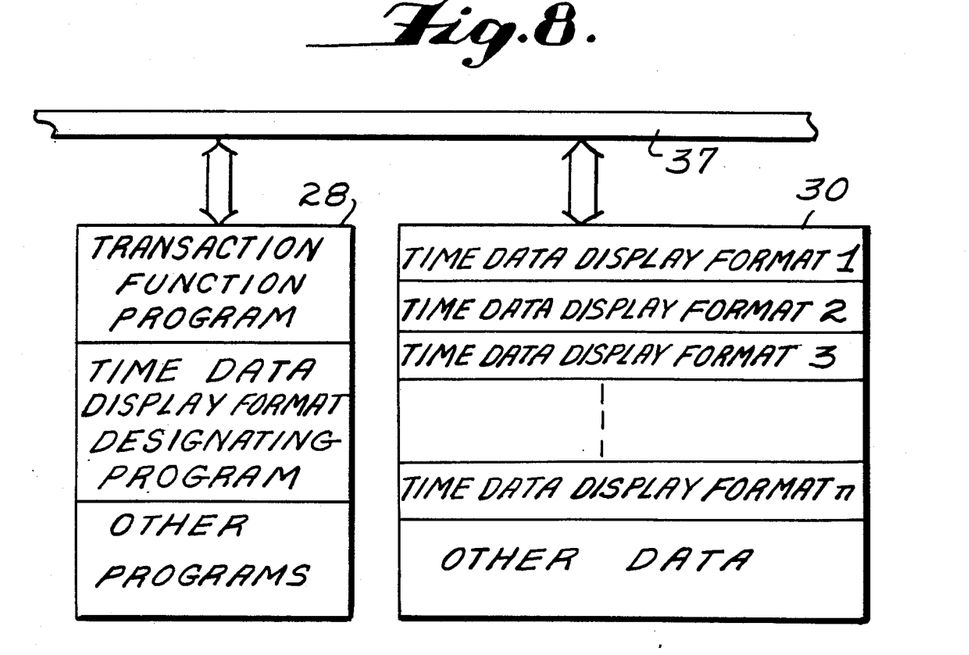
FIG. 8 is a diagram explaining the storage of data in a program memory and a data memory of the IC card according to the present invention.

The format of date and time data displayed on display 4 will be explained with reference to FIGS. 8 to 10. As shown in FIG. 8, a plurality of time data display formats (1 to n) are stored in data memory 30 in addition to transaction account data, transaction data, and the like. Program memory 28 stores a time data display format designation function program in addition to the transaction function program, the calculator function program, and the like.

The operation of the time data display format designation function of the above arrangement will be described below. The IC card is connected to the terminal (not shown). CPU 27 discriminates a time data display format designation request command from the terminal, and starts execution of the time data display format designation function program in program memory 28. CPU 27 sets, in timepiece circuit 32 (FIG. 3), one of a plurality of time data display formats designated by the terminal. Thus, in the timepiece mode, the timepiece data is displayed on display 4 based on the selected time data display format.

Figure 9A:
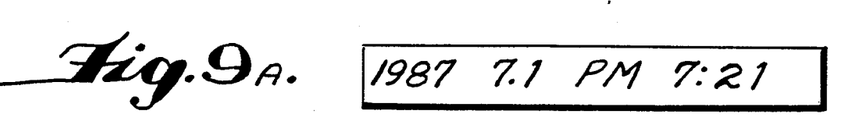
FIGS. 9A, 9B, and 9C and FIGS. 10A and 10B show display formats of timepiece data generated by the IC card according to the present invention.
Figure 9B:
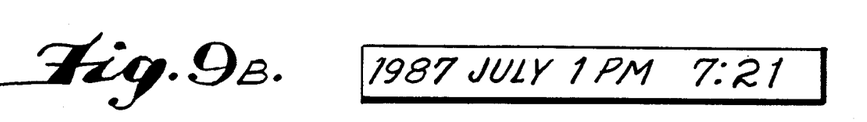
Figure 9C:
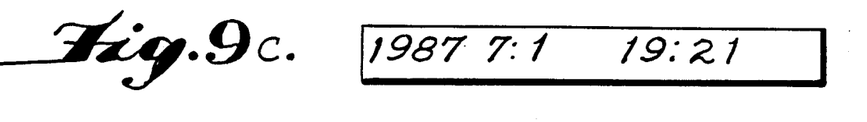
Figure 10A:
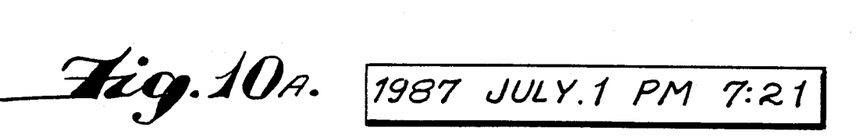
Figure 10B:
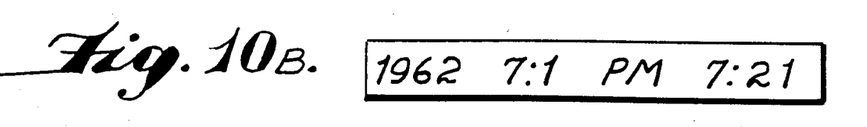

Examples of time data display formats are those of identical languages, as shown in FIGS. 9(a), 9(b) and 9(c) or those of different languages (English and Japanese), as shown in FIGS. 10(a) and 10(b). The formats of FIGS. 9 and 10 are designated depending on a user's favor, but maybe used in a general format in accordance with a card holder. In addition, time data display can be formatted in various other languages, e.g., French, Chinese, etc., so that the IC card be put into worldwide use.

While this invention has been described in connection with what is presently considered to be the most practical and preferred embodiment, it is to be understood that the invention is not limited to the disclosed embodiment, but, on the contrary, is intended to cover various modifications and equivalent arrangements included within the spirit and scope of the appended claims.

What is claimed:

1. A hand-held electronic circuit card, comprising:
memory means for storing data;
control means operable in accordance with at least first and second modes, for writing data to and reading data from said memory means;
clock generating means for generating clock pulses;
timepiece means for counting the clock pulses generated by said clock generating means to produce timepiece data;
display means for selectively displaying data from said control means and said timepiece means;
a keyboard having at least first and second keys;
start means for causing said control means to operate in accordance with said first mode wherein said display means displays timepiece data from said timepiece means in response to the operation of said first key; and
mode setting means for causing said control means to operate in accordance with said second mode in response to operation of said second key during display of the timepiece data.

2. A card according to claim 1 wherein said second mode is a calculator mode and wherein said control means includes means for carrying out arithmetic calculations and said second keys includes numerical keys for entering data to be calculated and wherein said display means displays entered and calculated data when said control means is operated in said calculator mode, the control means automatically changing from timepiece mode to calculator mode when any one of said second keys is operated.

3. A card according to claim 2 wherein when said control means is operating in said timepiece mode, the operation of one of said second keys causes a mode change to said calculator mode and substantially simultaneously therewith enters a digit corresponding to the second key operated for calculation.

4. A card according to claim 1 wherein said second mode is an "account" mode wherein said control means reads data from and writes data to said memory means and performs calculations with respect to at least one account.

5. An apparatus according to claim 1, wherein said keyboard further comprises a mode end key, and said mode setting means returns said control means to said first mode in response to operation of said mode end key.

6. An apparatus according to claim 5, wherein said mode setting means stops an operation of said control means in response to the operation of the mode end key during said first mode, and turns off said display means.

7. An apparatus according to claim 1, wherein said keyboard further comprises a mode advance key and a selection key, said mode setting means causes said display means to sequentially display a function mode in response to the operation of the mode advance key, and said control means is set in a mode displayed on said display means upon operation of the selection key.

8. A hand-held electronic apparatus, comprising:
memory means for storing data;
control means for performing data read/write access to said memory means;
timepiece means for counting clock pulses so as to generate timepiece data;
display means for selectively displaying data from said control means and said timepiece means;
a keyboard having at least a start key; and
start means for causing said display means to display timepiece data from said timepiece means in response to an operation of the start key at said keyboard and starting an operation of said control means.

9. An apparatus according to claim 8, wherein said keyboard further has a numerical key and an account key, and further comprising mode setting means for setting an operation mode of said control means in response to operation of the numerical key and the account key during display of the timepiece data on said display means.

10. An apparatus according to claim 8, wherein the timepiece data displayed on said display means including date data and time data.

11. An apparatus according to claim 10, wherein said display means alternately displays the date data and the time data.

12. An apparatus according to claim 10, wherein said memory means stores a plurality of types of time data display formats, and said display means displays the timepeice data based on an externally designated format.

* * * * *